June 30, 1964     H. C. EBERLINE     3,139,527
SCINTILLATION DETECTOR AND CIRCUIT FOR
LOW-ENERGY RADIOACTIVE PLUTONIUM Filed April 18, 1961     3 Sheets-Sheet 1

INVENTOR
H. C. EBERLINE

BY

ATTORNEYS

INVENTOR
H. C. EBERLINE
ATTORNEYS

United States Patent Office 3,139,527
Patented June 30, 1964

3,139,527
SCINTILLATION DETECTOR AND CIRCUIT FOR LOW-ENERGY RADIOACTIVE PLUTONIUM
Howard C. Eberline, Santa Fe, N. Mex., assignor to Eberline Instrument Corporation, Santa Fe, N. Mex.
Filed Apr. 18, 1961, Ser. No. 103,902
13 Claims. (Cl. 250—71.5)

This invention relates to radiation detection and more particularly to the detection of plutonium-239. It is known that plutonium-239 emits various rays having different energy levels and in varying amounts among which the 17 kev. X-ray is more abundant than other electromagnetic radiation.

Heretofore, detection of plutonium-239 by its characteristic 17 kev. ray has not been accomplished because of technical difficulties including the difficulty of separating the low energy level ray from background noise. In addition, the necessity of providing a detector responsive to low energy level rays but which attenuates alpha particles is presented.

A further problem has been that of providing a detector capable of locating and measuring radiation in the human body as well as providing a portable instrument for use over large areas of structure and terrain.

Accordingly, it is an object of the present invention to provide an efficient detector for plutonium-239.

A further object is to provide a detector for translating emanations in the 17 kev. range into pulse rates.

Another object is to provide a detector for counting pulses resulting from rays in a relatively narrow range slightly below the 17 kev. level and inclusive of pulses including higher energy radiation.

A further object of the invention is to provide an instrument for detecting rays beginning slightly below 17 kev.; and wherein the instrument shall have high resolution, on the order of 40 microseconds, and where the channel width of precise heights can be set, as desired, under control of a variable potentiometer, preferably linear in characteristic.

A further object is to provide an instrument for detecting rays in the 17 kev. range which may be used in close proximity to the source of energy or spaced substantially therefrom.

Figure 1:
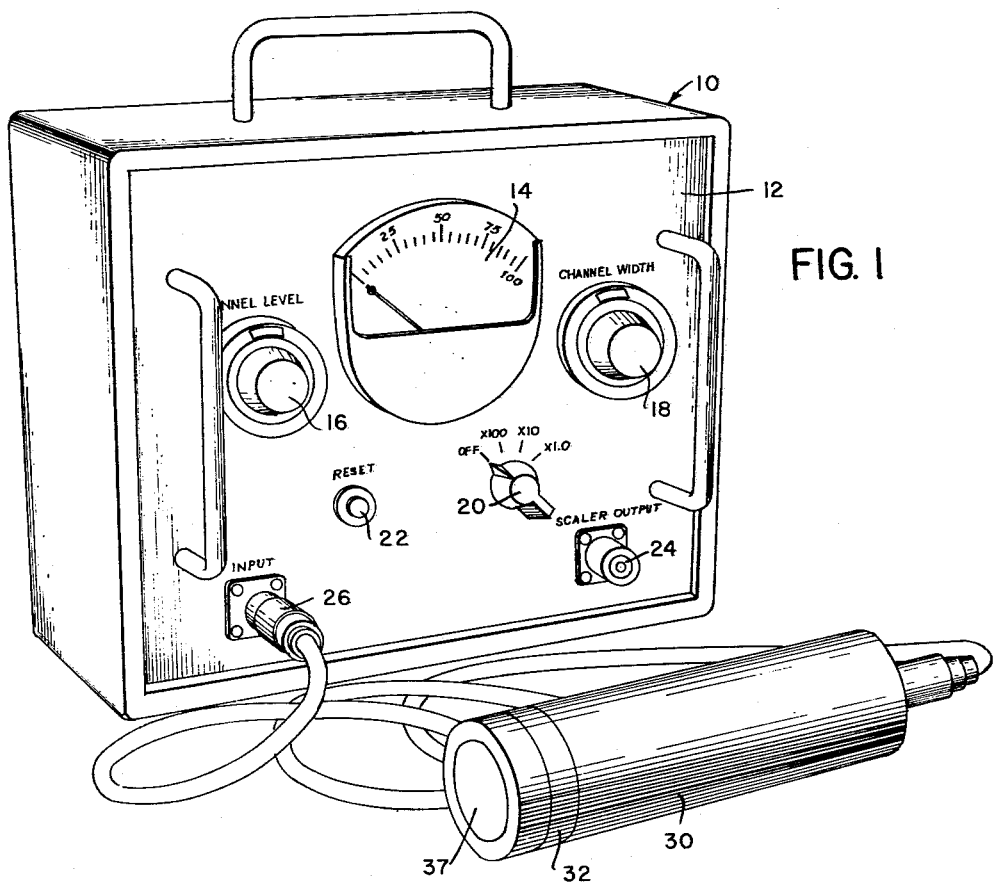
Figure 2:
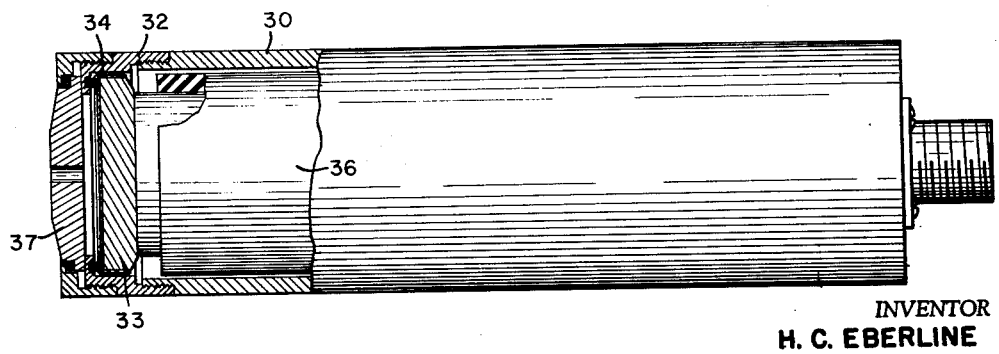
Figure 3:
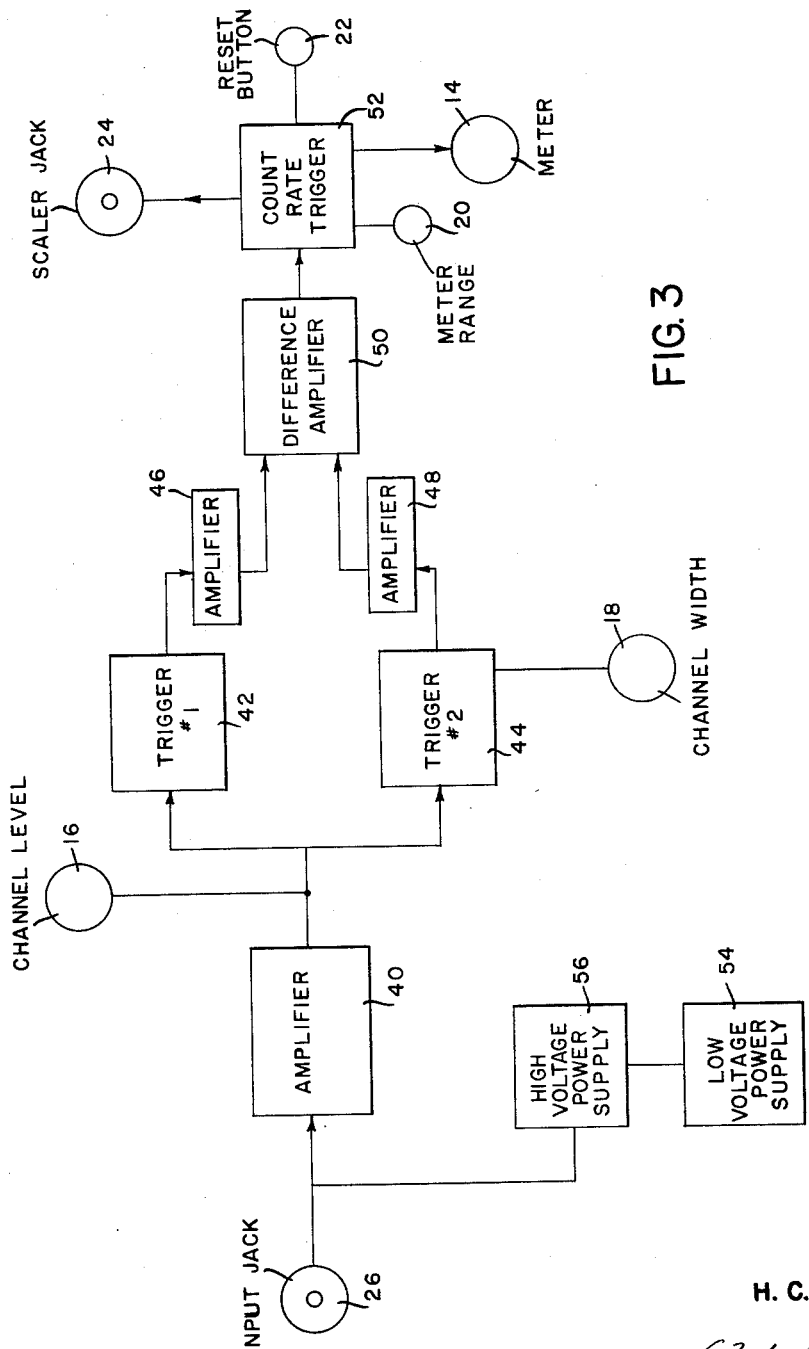
Figure 4:
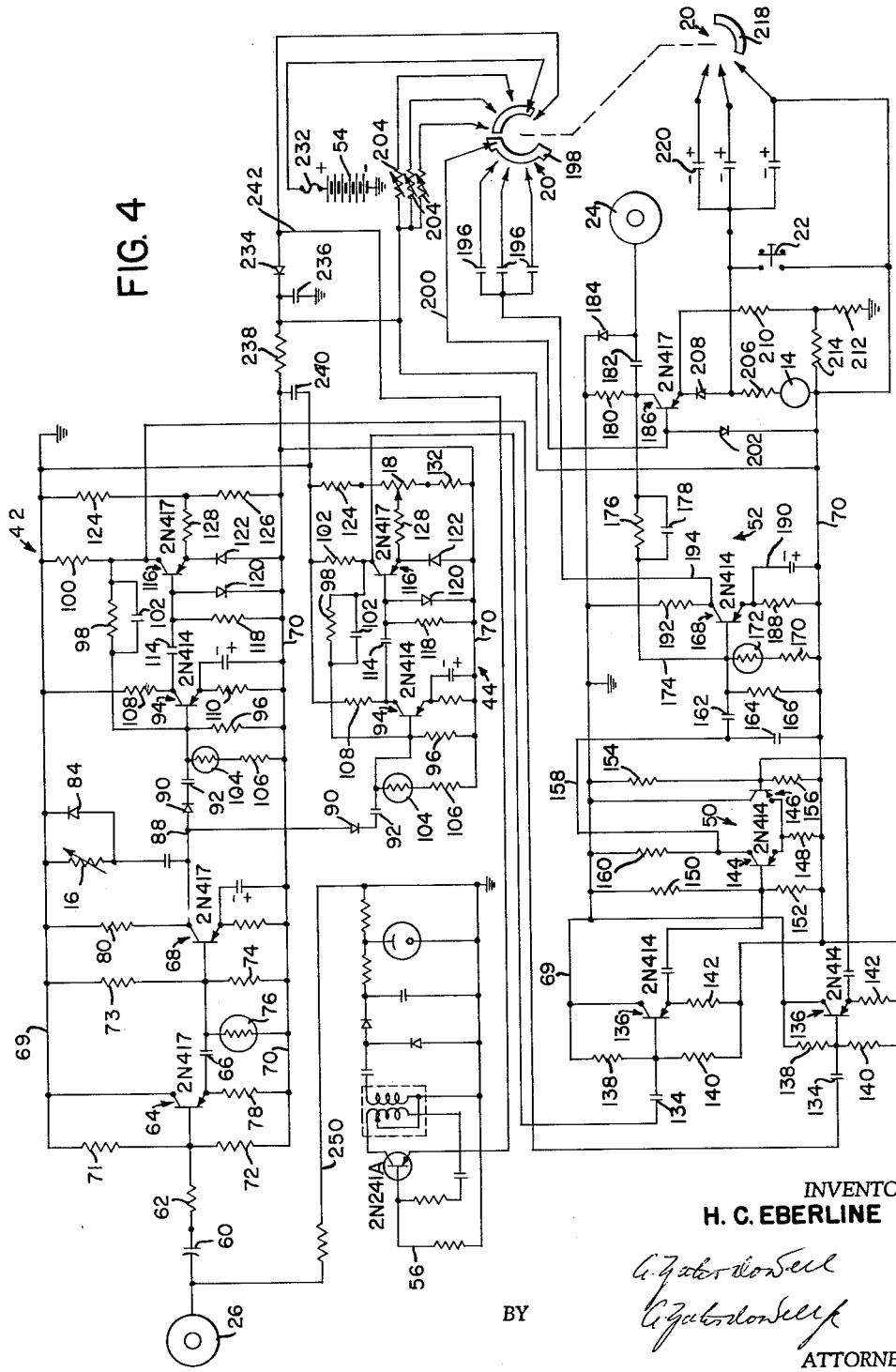

Other objects will become apparent upon consideration of the following specification in conjunction with the accompanying drawings in which:

FIG. 1 is a perspective view of an instrument in accordance with the present invention;

FIG. 2, a diagrammatic view of the probe forming a part of the instrument;

FIG. 3, a block diagram of the monitor forming another part of the instrument; and FIG. 4, a circuit diagram of the monitor.

Briefly stated, the instrument of the present invention includes a scintillation probe having a photomultiplier tube with a window opening next to which is positioned a thin scintillation crystal having a thin protective window. The crystal dimension is selected to absorb primarily low energy level radiation in the range of that to be detected and the protective window is of such thickness that it attenuates very little of the low energy level rays being detected but protects the crystal against moisture and attenuates alpha radiation. The absorbed low energy level radiation in the crystal causes flashes of light and these are amplified by the photomultiplier tube and relayed as pulses into a monitor. The monitor includes a preamplifier and in series therewith, two parallel trigger circuits or triggers including monitor amplifier circuits operative at different voltage levels, one being of fixed sensitivity, the other being variable. By decreasing the sensitivity of the variable trigger amplifier there results a range of pulse heights which will trigger the fixed trigger but not the variable trigger. The outputs from the two circuits or triggers are fed through isolators into a difference amplifier from which the resultant signal is transmitted into a pulse rate counter. By adjustment of the variable trigger the range of pulse heights may be selected.

Referring more particularly to FIG. 1, at 10, FIG. 1 is a casing housing the electronic circuitry of the monitor and including a panel 12 in which is mounted a meter 14 on which there is indicated in terms of events per minute, the rate of pulses measured by the monitor. On the panel there is also mounted a channel level potentiometer control knob 16 which controls the sensitivity of the pair of triggers within the casing, a channel width control knob 18 which controls the energy range output of the monitor, a selector knob 20 to control the meter range, a reset button 22 to enable immediate return of the meter to zero, a scaler output jack 24 to obtain signals taken from count rate trigger circuit within the casing in order to drive an external scaler, and an input jack 26.

The probe, shown diagrammatically in FIG. 2, comprises a housing 30 which may be of stainless steel and having a cap 32 within which is sealed a sodium iodide crystal 33 of approximately 1 mm. thickness to facilitate the translation of electromagnetic radiation penetrating the crystal down to the order of 17 kev. into light scintillations, the crystals being covered by an aluminum protective covering 34 of the order of .001 inch so as to impose exceedingly small attenuation on the low energy 17 kev. emanation while yet affording a moisture proof covering for the crystal. Such covering also is sufficient to attenuate any alpha particles. The scintillations which occurs in the crystal are picked up by a conventional photomultiplier tube 36 within the probe and transmitted to the injut jack 26.

Collimators 37 comprising thick nickel-steel discs with different size apertures therein may be provided for retention by the cap 32 when it is desirable to ascertain more precisely the location of plutonium in an area or, for example, where exposure of a portion of the human body is suspected, the precise location of the foreign body or affected area may be determined in order that appropriate treatment may be prescribed. The collimators may be replaced by an imperforate cap when the probe is not in use.

Since the rays have a range of several feet or more a detector similar to that described may be manually carried or appropriately mounted for monitoring a relatively large area.

The input jack 26, see FIG. 3, feeds the signal picked up by the photomultiplier tube to an amplifier 40 and from there, in parallel, to the pair of triggers 42 and 44 also indicated in FIG. 3 as trigger #1 and trigger #2. Trigger 42 has a fixed sensitivity while trigger 44 has a control knob 18 therefor which controls the sensitivity of trigger 44 from levels where it is equal to that of trigger 42 to values less than that of the other trigger. The outputs of the triggers are fed through amplifiers 46 and 48 and are combined in a difference amplifier 50 which then feeds the difference signal to a count rate trigger 52 and thence to the meter 14 and scaler output jack 24, the meter sensitivity being under control of the meter range knob 20, and the meter being quickly reset to zero on desired change of sensitivity of the meter by operation of reset button 22. The monitor also has a low voltage supply 54 and high voltage power supply 56 to feed the instrumentalities within the monitor casing and the probe.

Referring to FIG. 4, the input jack 26 feeds an incoming pulse via a capacitor 60 and resistor 62 to the base of a signal amplifying transistor 64, the amplified pulse from the transistor then being transmitted via the capacitor 66 to an emitter follower transistor 68, the bases of the transistor being biased from a grounded line 69 and a low voltage (e.g., 6 volt) battery supply line 70 and resistor networks 71, 72 and 73, 74. A suitable thermistor 76 is employed to temperature stabilize the input to the emitter follower. The emitter of transistor 64 is connected to the supply line 70 via a resistor 78.

The pulse signal from the emitter follower 68 is fed, in parallel, to two triggers. The magnitude of the signal so fed to the two triggers is under control of a network comprising a resistor 80 between the collector of transistor 68 and ground line 69 to establish a potential difference between the two and a network in parallel with resistor 80 consisting of a capacitor 82 in series with a parallel circuit comprising a diode 84 and potentiometer 16, preferably linear in character. The signal appearing at the junction point 88 leads to the two triggers 42 and 44, and is attenuated, as desired by adjustment of the potentiometer 16.

Each of the triggers comprises a two stage transistor amplifier, alike except for the output from the emitter of the second stage. Therefore, except as pointed out above, only one of the trigger circuits and the like feed thereto need be described in detail, like numbers being applied to the two circuits where they are identical.

Thus, with particular regard to trigger 42, the signal pulse appearing at the junction 88 passes through a diode 90 and a capacitor 92 to the base of a transistor 94, suitable bias being applied to the base of the transistor by divided resistor network 96, 98 and 100. It is preferred to bypass resistor 98 with a small capacitor 102 to help stabilize the biasing potential on the transistor 94. A thermistor 104 in the base circuit of the transistor and resistor 106 help to temperature stabilize the bias on the base of the transistor 94.

The collector of transistor 94 is connected via resistor 108 to ground, while a small resistor 110 bridged by a capacitor 112 conducts amplified current in the emitter collector circuit of transistor 94. The collector of transistor 94 is coupled via capacitor 114 to the base of transistor 116, said transistor being biased by resistor 118 and diode 120 across the 6 volt supply line 70 and base of the transistor 116. The collector of transistor 116 is connected to ground via the resistor 100.

The emitter in each trigger circuit is fed with current via a diode 122, the voltage on the emitter being under control of a dividing network. In the case of trigger 42, the network comprises fixed voltages dropping resistors 124 and 126 and a resistor 128 connected at one end to the emitter of transistor 116 and at its other end to a point intermediate the voltage dropping resistors.

In trigger 44 the resistor 126 is replaced by potentiometer 18 in series with a fixed resistor 132 and the resistor 128 terminates in the adjustable arm of the potentiometer. The purpose of the potentiometer is to enable the sensitivity of trigger 44 to be varied from a value where it is the same as the other trigger 42 to values less sensitive than trigger 42. When the potentiometer is set to render trigger 44 less sensitive than trigger 42, it requires a pulse of greater magnitude to trigger it than to trigger 42.

The pulses from each of the triggers are led via a respective capacitor 134 to the base of a respective transistor 136, there being a voltage dividing network 138, 140 connected to the base of each transistor 136 to impose a bias on the same. Amplified emitter collector current flows through each of the transistors via a respective load resistor 142.

The outputs from the two transistors are coupled to the bases of two preferably matched transistors 144 and 146 of the difference amplifier 50. The two emitters of the transistors 144 and 146 coupled together and via a resistor 148 are connected to the low voltage supply. The bases of the transistors 144 and 146 are biased by voltage dividing networks 150, 152, and 154, 156 respectively. The collector of transistor 144 is connected via a line 158 to the count rate trigger 52, a resistor 160 being connected between the collector of transistor 144 and ground to create a potential on the collector.

With pulses of equal positive potential applied to the base of the transistors 144 and 146, current may flow through both transistors through the common resistor 148, but due to the direct connection of the collector of transistor 146 to ground, insufficient voltage will be developed across the resistance 160 in the circuit of transistor 144 to pulse the line 158 sufficient to operate the trigger 52. Where the pulse applied to the base of transistor 146 is sufficiently low, there will be an increase of current flow through the transistor 144 and resistor 160, making the pulse in line 158 sufficiently positive to trigger the following count rate trigger 52, here shown in the form of a monostable or one shot multivibrator. The pulse in line 158 is peaked by the capacitor resistor network consisting of small capacitor 162, larger capacitor 164 and resistor 166 and transmitted to the base of a transistor 168, biased to be normally conductive from the low voltage supply via a resistor 170 and thermistor 172. The pulses applied to the multivibrator are led to the scaler output jack 24 via line 174, a resistor 176, bypassed by a small capacitor 178, and a network comprised of resistor 180, capacitor 182 and diode 184.

The one shot multivibrator comprises the transistor 168, a second transistor 186 and an interconnecting network.

The transistor 168 emitter-collector circuit includes a resistance 188 connected to the emitter and low voltage line, the resistance being bypassed by a large voltage stabilizing capacitor 190, and a resistor 192 between the collector and ground. A line 194 from the collector leads to a number of capacitors 196 of different values and selectivity connected via one deck of a wafer 198 of scale switch 20 and line 200 to the base of transistor 186, the pulse rendering transistor 186 conductive. A diode 202 connects the base to the lower power supply line. The switch wafer 198 also connects in a selected one of adjustable resistors 204, which may be of like values, these resistors, through the low power supply and resistor 192 shunting the capacitors 196 and each forming an RC circuit or calibration pot to interconnect the two transistors of the multivibrator.

A pulse will trigger transistor 168 and through a capacitor 196 trigger transistor 186 which will remain in conductive relation until the charge on selected capacitor 196 is dissipated via the resistors 204 the low power supply and resistor 192, whereupon transistor 186 will be cut off since the diode 202 prevents the application of positive potential to its base.

The collector of transistor 186 is connected to ground via resistor 180 while the emitter has voltage applied to it via a network consisting of meter 14, a resistance 206 and diode 208 shunted by resistors 210 and 212 with a resistor 214 connected between the meter input and the junction between resistors 210 and 212. These pulses through the emitter collector circuit of transistor 186 will appear on the meter.

In order to integrate these pulses there is coupled for movement with the switch deck 198 of switch 20 a second deck 218, which can place a capacitor 220 or one of a like number of capacitors across the meter 14 and resistor 206 whereby the accumulated pulses through the meter will progressively move the needle across its scale to give a reading of "Events per Minute," the capacitor and resistance 206 being selected to be of proper value.

The one-short multivibrator, it should be noted, responds to any level of signal above a triggering level and therefor the meter 14 will record integrated pulse rates rather than integrated pulse levels. The capacitor 220 discharges through the resistance 206 and the meter.

Should a quick reset of the meter be desired, as when a new series of readings is to be taken, the capacitor 220 may be quickly discharged by operation of the reset switch 22 shorting the capacitor.

A low voltage supply 54 in the form of a battery grounded at its negative side is connectible to the line 70 via the wafer 198 of switch 20. The battery feeds the line via fuse 232, switch deck 198, diode 234 and pi filter comprised of capacitor 236, resistor 238 and capacitor 240.

The low voltage supply, via a line 242, feeds a standard high voltage power supply 56 including a transistor oscillator, filter and voltage regulating tube. A high voltage line 250 from the high voltage supply leads to the input jack 26.

To initiate operation, the scale switch 20 is set at any position depending on the scale desired. A plutonium source is placed close to the crystal in the probe and the channel width control 18 is set to give the maximum reading on the meter 14. The channel width control is then reduced until the meter reading starts to decrease. This point is the one with minimum background count, for maximum plutonium count. Proper setting of the channel level control potentiometer 16 in conjunction with the setting of potentiometer 18 will result in attaining a desired signal level suitable for handling the pulses obtained from the probe, and of a desired spread of signal magnitudes.

The sensivity of the two trigger amplifiers 42 and 44 is approximately the same with the channel width control 18 set at zero, i.e., with the movable contact at one end of the potentiometer resistance and nearest the resistor 124. As the control is turned up trigger #2, like trigger 44, becomes less sensitive since it takes a higher energy pulse to trigger it. Thus amplifier 42 may be triggered by a range of pulse heights which will not trigger amplifier 44. When pulses are obtained from both triggers, the difference amplifier 50 puts out a pulse but of much lesser magnitude. If of sufficient height the pulse will trigger the count rate trigger 52 or monostable multivibrator and an indication will appear on the meter.

It will be obvious to one skilled in the art that various changes may be made in the invention without departing from the spirit and scope thereof and therefore the invention is not limited by that which is illustrated in the drawings and described in the specifictaion, but only as indicated in the accompanying claims.

What is claimed is:

1. A scintillation probe comprising a housing enclosing a thin sodium iodide crystal covered by a very thin, electromagnetic, ray transparent foil of aluminum and a photomultiplier tube in position to detect scintillations occurring in the crystal and translate them into an electrical pulsed output, in combination with a monitor, said monitor including a pair of parallel amplifiers into which the output from the photomultipliers is coupled, a potentimoeter connected to both amplifiers to simultaneously vary their input level, a control within one of the amplifiers to vary the sensitivity thereof to vary the channel width of signal to be transmitted therethrough, the sensitivity varying from that equal to the other amplifier to sensitivities below that of said other amplifier, a difference amplifier and a monostable multivibrator connected to the output of the difference amplifier, separate output leads from the amplifiers leading to the difference amplifier, and a meter in the multivibrator circuit to meter the pulses therein.

2. A scintillation probe comprising a housing enclosing a thin sodium iodide crystal covered by a very thin, electromagnetic ray transparent foil of aluminum, a collimator covering the foil, and a photomultiplier tube in position to detect scintillations occurring in the crystal and translate them into an electrical pulsed output, in combination with a monitor, said monitor including a pair of parallel amplifiers into which the output from the photomultipliers is coupled, a potentiometer connected to both amplifiers to simultaneously vary their input level, a control within one of the amplifiers to vary the sensitivity thereof to vary the channel width of signal to be transmitted therethrough, the sensitivity varying from that equal to the other amplifier to sensitivities below that of said other amplifier, a difference amplifier and a monostable multivibrator connected to the output of the difference amplifier, separate output leads from the amplifiers leading to the difference amplifier, and a meter in the multivibrator circuit to meter the pulses therein.

3. A scintillation probe comprising a housing enclosing a thin sodium iodide crystal covered by a very thin, electromagnetic ray transparent foil of aluminum and a photomultiplier tube in position to detect scintillations occurring in the crystal and translate them into an electrical pulsed output, in combination with a monitor, said monitor including a pair of parallel amplifiers into which the output from the photomultipliers is coupled, a potentiometer connected to both amplifiers to simultaneously vary their input level, a control within one of the amplifiers to vary the sensitivity thereof to vary the channel width of signal to be transmitted therethrough, the sensitivity varying from that equal to the other amplifier to sensitivities below that of said other amplifier, a difference amplifier and a monostable multivibrator connected to the output of the difference amplifier, separate output leads from the amplifiers leading to the difference amplifier, a meter in the multivibrator circuit to meter the pulses therein, said meter having a resistor in series therewith and a capacitor across the resistor and meter to integrate the pulses passing therethrough.

4. A scintillation probe comprising a housing enclosing a thin sodium iodide crystal covered by a very thin, electromagnetic ray transparent foil of aluminum and a photomultiplier tube in position to detect scintillations occurring in the crystal and translate them into an electrical pulsed output, in combination with a monitor, said monitor including a pair of parallel amplifiers into which the output from the photomultipliers is coupled, a potentiometer connected to both amplifiers to simultaneously vary their input level, a control within one of the amplifiers to vary the sensitivity thereof to vary the channel width of signal to be transmitted therethrough, the sensitivity varying from that equal to the other amplifier to sensitivities below that of said other amplifier, a difference amplifier and a monostable multivibrator connected to the output of the difference amplifier, separate output leads from the amplifiers leading to the difference amplifier, a meter in the multivibrator circuit to meter the pulses therein, said meter having a resistor in series therewith and a capacitor across the resistor and meter to integrate the pulses passing therethrough, and a short circuiting switch across the capacitor.

5. A low energy level X-ray detector comprising a scintillation probe having an output lead, and a monitor, the monitor comprising a pair of trigger amplifiers one of which has a fixed sensitivity and the other of which has a sensitivity variable from a value equal to the sensitivity of the first amplifier to values therebelow, said trigger amplifiers being coupled in parallel with the output lead from the probe, a difference amplifier coupled to the outputs from the trigger amplifiers, a pulse creating device triggered by the output from the difference amplifier and a meter coupled to the pulse creating device to receive the pulses therefrom.

6. A low energy level X-ray detector comprising a scintillation probe having an output lead, and a monitor, the monitor comprising a pair of trigger amplifiers one of which has a fixed sensitivity and the other of which has a sensitivity variable from a value equal to the sensitivity of the first amplifier to values therebelow, said trigger amplifiers being coupled in parallel with the output lead from the probe, a difference amplifier coupled to the outputs from the trigger amplifiers, a pulse creating device triggered by the output from the difference amplifier and a meter coupled to the pulse creating device to receive the pulses therefrom, said pulse creating device comprising a monostable multivibrator.

7. A low energy level X-ray detector comprising a scintillation probe having an output lead, and a monitor, the monitor comprising a pair of trigger amplifiers one of which has a fixed sensitivity and the other of which has a sensiitvity variable from a value equal to the sensitivity of the first amplifier to values therebelow, said trigger amplifiers being coupled in parallel with the output lead from the probe, a difference amplifier coupled to the outputs from the trigger amplifiers, a pulse creating device triggered by the output from the difference amplifier and a meter coupled to the pulse creating device to receive the pulses therefrom, said pulse creating device comprising a monostable multivibrator, said meter having a series resistor connected thereto, and an RC network shunted across the meter and its series connected resistance.

8. A low energy level ray detector comprising a scintillation probe having an output lead and a monitor, the probe having a sodium iodide crystal of the order of 1 mm. thick covered by an aluminum foil of the order of .001 inch thick to pass gamma rays in the 17 kev. range, the monitor comprising a pair of trigger amplifiers one of which has a fied sensitivity and the other of which has a sensitivity variable from a value equal to the sensitivity of the first amplifier to values therebelow, said trigger amplifiers being coupled in parallel with the output lead from the probe, a difference amplifier coupled to the outputs from the trigger amplifiers, a pulse creating device triggered by the output from the difference amplifier and a meter coupled to the pulse creating device to receive the pulses therefrom.

9. In a plutonium wound monitor, an input circuit, a pair of trigger amplifiers coupled in parallel to the input circuit and each having an output, means for varying the sensitivity of one of said amplifiers from a condition where it is the same as that of the other trigger to below said sensitivity, a difference amplifier having two inputs connected respectively to the outputs from the trigger amplifiers, a single output from said difference amplifier, a monostable multivibrator connected to the output of the difference amplifier, and a circuit including a meter in the output of the difference amplifier.

10. In a plutonium wound monitor, an input circuit, a pair of trigger amplifiers coupled in parallel to the input circuit and each having an output, means simultaneously and in like degree controlling the level of input signal to both of said trigger amplifiers, means for varying the sensitivity of one of said amplifiers from a condition where it is the same as that of the other trigger to below said sensitivity, a difference amplifier having two inputs connected respectively to the outputs from the trigger amplifiers, a single output from said difference amplifier, a monostable multivibrator connected to the output of the difference amplifier, and a circuit including a meter in the output of the difference amplifier.

11. In a plutonium wound monitor, an input circuit, a pair of trigger amplifiers coupled in parallel to the input circuit and each having an output, means for varying the sensitivity of one of said amplifiers from a condition where it is the same as that of the other trigger to below said sensitivity, a difference amplifier having two inputs connected respectively to the outputs from the trigger amplifiers, a single output from said difference amplifier, a monostable multivibrator connected to the output of the difference amplifier, a circuit including a meter in the output of the difference amplifier, and a capacitor shunting the meter circuit.

12. In a plutonium wound monitor, an input circuit, a pair of trigger amplifiers coupled in parallel to the input circuit and each having an output, means for varying the sensitivity of one of said amplifiers from a condition where it is the same as that of the other trigger to below said sensitivity, a difference amplifier having two inputs connected respectively to the outputs from the trigger amplifiers, a single output from said difference amplifier, a monostable multivibrator connected to the output of the difference amplifier, a circuit including a meter in the output of the difference amplifier, a capacitor shunting the meter circuit, and a meter reset button shunting the capacitor.

13. In a plutonium wound monitor, an input circuit, a pair of trigger amplifiers coupled in parallel to the input circuit and each having an output, means for varying the sensitivity of one of said amplifiers from a condition where it is the same as that of the other trigger to below said sensitivity, a difference amplifier having two inputs connected respectively to the outputs from the trigger amplifiers, a single output from said difference amplifier, a monostable multivibrator connected to the output of the difference amplifier comprising two transistors with the collector of one transistor variably resistance-capacity coupled to the base of the second transistor, and a circuit including a meter in the output of the difference amplifier.

References Cited in the file of this patent

UNITED STATES PATENTS

| | | |
|---|---|---|
| 2,688,703 | Di Giovanni et al. | Sept. 7, 1954 |
| 2,727,154 | Goldsworthy | Dec. 13, 1955 |
| 2,923,824 | Martin et al. | Feb. 2, 1960 |
| 2,952,774 | Howard | Sept. 13, 1960 |
| 2,994,781 | Brooks | Aug. 1, 1961 |
| 3,093,738 | Mann et al. | June 11, 1963 |

OTHER REFERENCES

Upson et al.: Analyzing for Low-Energy Gamma Emitters in a Radionuclide Mixture, Nucleonics, April 1955, pp. 38–41.

Kueker: Transistorized Scintillation Counter, Radio-Electronics, March 1957, pp. 34–37.

Spear: Transistorized Radiation Survey Instruments, Nucleonics, June 1957, page 100.